United States Patent

Hughes et al.

[11] Patent Number: 5,840,185
[45] Date of Patent: Nov. 24, 1998

[54] SPORTS BOTTLE FILTER CARTRIDGE

[75] Inventors: Douglass Hughes, Reno, Nev.; Roger P. Reid, Caldwell, Id.

[73] Assignee: Douglass E. Hughes, Boulder, Colo.

[21] Appl. No.: 685,334

[22] Filed: Jul. 23, 1996

[51] Int. Cl.⁶ .................................................. B01D 27/08
[52] U.S. Cl. ....................... 210/232; 210/266; 210/282; 210/286; 210/472; 210/474; 210/477; 222/189
[58] Field of Search ............................ 222/189; 210/232, 210/266, 282, 286, 472, 474, 477

[56] References Cited

U.S. PATENT DOCUMENTS

| | | | |
|---|---|---|---|
| 4,673,501 | 6/1987 | Wells et al. | 210/474 |
| 4,714,550 | 12/1987 | Malson et al. | 210/244 |
| 4,800,018 | 1/1989 | Moser | 210/266 |
| 4,938,389 | 7/1990 | Rossi et al. | 222/189 |
| 5,122,272 | 6/1992 | Iana et al. | 210/473 |
| 5,139,666 | 8/1992 | Charbonneau et al. | 210/264 |
| 5,200,070 | 4/1993 | McMenamin | 210/282 |
| 5,405,526 | 4/1995 | Sutera | 210/124 |
| 5,417,860 | 5/1995 | Kay | 210/477 |
| 5,431,813 | 7/1995 | Daniels | 210/282 |
| 5,609,759 | 3/1997 | Nohren, Jr. et al. | 210/266 |
| 5,616,242 | 4/1997 | Mandola | 210/474 |
| 5,653,878 | 8/1997 | Reid | 210/266 |

*Primary Examiner*—W. L. Walker
*Attorney, Agent, or Firm*—Ken J. Pedersen; Barbara S. Pedersen

[57] ABSTRACT

Embodiments of a filter cartridge for a sports bottle are shown and described. Each embodiment has a member for containing or attaching to a filter media and having a means of securing the cartridge inside the bottle neck without requiring modification of the bottle or bottle cap. The preferred cartridge includes a generally cylindrical cup or ring for holding media, and an extension that fits between the cap and the bottle neck to secure the cartridge in place while preserving a water-tight seal. The extension has a slanted inner surface that diverts the cap's knife edge inward slightly and then seals with the outside surface of the knife blade. As the cap is installed and the knife presses down against the extension, the knife forces the expandable or flexible extension outward slightly to seal against the neck. The extension is sized to have a wall thickness, in the region where it is captured between the cap knife and the neck, that will allow the cap to be lowered nearly to the extent that it would be without the presence of the filter cartridge. Thus, the cartridge-neck and cartridge-cap seals replace the normal neck-cap seal of a standard sports bottle.

20 Claims, 3 Drawing Sheets

SPORTS BOTTLE FILTER CARTRIDGE

BACKGROUND OF THE INVENTION

1. Field of the Invention

This invention relates, generally, to water filters. More specifically, this invention relates to a filter cartridge constructed to fit inside a sports water bottle for filtering water flowing out of the bottle as the user drinks the water.

2. Related Art

Wherever water is used for drinking and/or cooking, the treatment of water is an increasingly important issue. Globally, people are awakening to the fact that water is contaminated with microorganisms, and with residuals from agriculture, industry and even municipal treatment. Studies suggest that tap water may contribute to risk of colon and bladder cancer.

In response to concerns about water quality, many people regularly purchase bottled water or filter their own water for their homes and offices. Filtering devices are selling throughout North America in the form of carafes and faucet-mounted and countertop filter units.

Sports enthusiasts, athletes, and others involved in physical conditioning are also interested in improving the quality of water they drink during their sport or conditioning. They are particularly interested in removing chlorine and its taste from the water carried in their sports bottles. Active individuals prefer to minimize the weight of water they carry, so they typically carry only one or two standard sports bottles, which are usually less than 32 oz., and often only 20–24 oz., in capacity. When the bottle(s) are empty, the user typically refills the bottle "on the go" at a city water tap. Therefore, there is a need for an effective and economic filter for sports bottles to improve water quality for the typical health-conscious user.

The standard sports bottles is familiar to most people as the bottle associated with bicycles. These bottles now have a wide assortment of applications, for example, as standard equipment for back packs. These bottles and their caps vary somewhat in shape and size, but are of the same general shape and function. The majority of users prefer the shape and weight of the conventional 24–28 oz. sports bottle, which is portrayed generally by the bottle in FIG. 1. Several cap designs are made for these sports bottles, but they typically include a knife which is a slightly flexible ring protruding downward from the underside of the cap, for sealing against the inner surface of the bottle neck.

Filters for sports bottles have been made in the past, but they are typically inconvenient, complicated, and lack the benefit of fitting universally into a wide variety of sports bottles. Previous filter designs attach to the bottle cap after some significant modification of the bottle cap, as illustrated below.

One commercial filter requires custom modification of the bottle cap to include a filter through which water passes as it flows from the bottle reservoir out through the cap valve to the user's mouth. This design has the inherent problem of requiring cap modification, thereby eliminating the possibility of the filter fitting anything other than the custom-modified cap.

Another commercial approach has been to fit the filter into the bottle cap with O-rings, by specially molding the cap to receive these O-rings. This, too, requires custom modification of the bottle cap, with the associated expense and loss of universal-fit.

In another application, a manufacturer welds a cone into the cap and then inserts a plastic tube into the cone, and connects a filter cartridge in fluid communication with the plastic tube. The cartridge reaches to the bottom of the bottle, meaning that the user can only use the bottle by bending over the bottle and squeezing the bottle to force water through the filter cartridge, up the tube, and out the valve spout and up into the user's mouth. Some manufacturers deal with this by removing the typical valve spout and replacing it with a plastic straw, permanently molded to the cap.

Alternatively, filter manufacturers have molded carbon blocks to fit up inside a sports bottle cap. These molded carbon blocks have the disadvantage of only fitting one design of bottle cap and being limited to a size and weight that will stay secured in the cap.

SUMMARY OF THE INVENTION

An object of the present invention is to provide a liquid filter system that fits into a wide variety of sports bottles, with little or no modification of the sports bottle or its cap, for removing contaminants from water, notably chlorine, taste, odor, color, sediment and adsorbable organics. Another object is to provide an economical and easy-to-use filter cartridge, preferably with a minimum of parts and installation steps. Another object is to provide a filter system that allows normal use of the sports bottle, that is, drinking water by tilting the bottle to a horizontal or higher-than-the-head position to squeeze water into the user's mouth.

The present invention comprises a filter cartridge, for containing one or more filter medias, which can be easily inserted and sealed into the sports bottle neck without modification of the sports bottle or cap. The cartridge comprises a media containment means and a securing means. The containment means is for holding or being attached to a filter media. The securing means is for holding the cartridge in the sports bottle neck, without requiring modification of the bottle or cap and without causing leaks.

In the preferred embodiment, the media containment means comprises a cylindrical, hollow cup, having a water-permeable top and bottom for allowing water flow through the bottle neck via the media-filled interior space of the cup.

In the preferred embodiment, the securing means comprises an upper portion of the cup, which rests on the lip of the sports bottle and is generally coaxial with the bottle neck. The upper portion is generally cylindrical, with a radial flange extending over the neck lip, and has inner and outer sealing surfaces. The flange and sealing surfaces are constructed in such a way as to allow the bottle cap to be installed over the flange in a water-tight seal. The inner sealing surface seals to the bottle cap and the outer sealing surface seals to the bottle neck near the bottle lip. The upper portion is designed with a thin wall and with a slanted surface to allow the cap knife, or other cap sealing means, to come down, divert inward, and seal against the cup upper portion, without hanging-up on the cartridge in a position that would allow leaks. The cartridge is secured by the upper portion being clamped between the bottle neck and the cap, preferably without other attachment means, and so is easily removable and replaceable.

DESCRIPTION OF THE PREFERRED EMBODIMENTS

Figure 1:
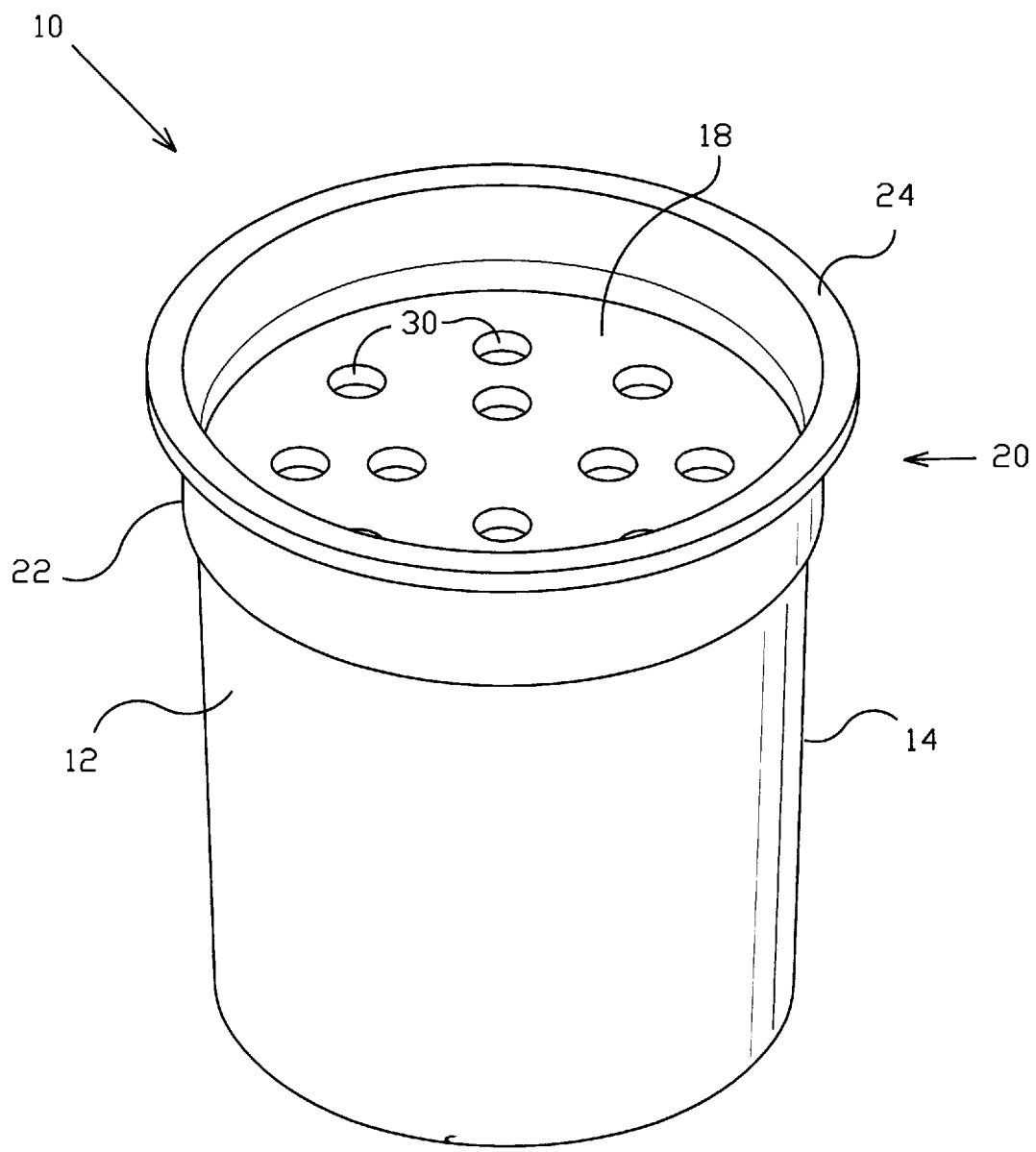
FIG. 1 is an isometric side view of one embodiment of the invented filter cartridge for a sports bottle.

Referring to FIGS. 1–5, there is shown one, but not the only, embodiment of the invented filter cartridge 10 for a sports bottle 50. The filter cartridge 10 comprises a media containment means, which is a generally-cylindrical cup 12 having a side wall 14, a bottom wall 16, and a lid 18. The upper portion 20 of the cup 12 acts as a securing means for holding the cup and media in a generally fixed position in the sports bottle once the bottle cap is installed. The upper portion 20 comprises a generally-axial upending wall 22 and a generally radial flange 24 extending away from the axial centerline of the cup 12.

In use, filter media 26 is placed inside the interior space 28 of the cup 12. The filter media 26 may include solid, granular, or other materials. Conventional media support material, such as felt pads or mesh (not shown), may be included inside the cup 12 to support and/or contain the media.

The cup bottom wall 16 and lid 18 preferably have apertures for allowing water flow into and out of the interior space 28. Alternatively, other apertures besides the plurality of holes 30 may be included in the bottom wall 16 and the lid 18. For example, the bottom wall and lid may be formed of screen or other water-permeable material.

Preferably, but not necessarily, the cup 12 with upending wall 22 and flange 24 is a single piece of molded plastic and the lid 18 is a single piece of plastic fixedly attached to the cup 12. The lid 18 may be installed in the cup 12, for example, by sonic welding after media 26 is installed in the interior space 28. Preferably, the outer perimeter 31 of the lid 18 rests on a ledge 32 formed in the cup side wall 14 near the bottom end of the upending wall 22.

In use, the generally cylindrical cartridge 10 fits into the generally cylindrical neck 52 of the sports bottle 50, and is held in the bottle 50 by the cooperation of the flange 24 resting on bottle lip 54. Typically, the bottle is prepared for use by removing the cap 55, filling the bottle body 56 with water, inserting the cartridge 10 into the neck 52 and replacing the bottle cap 55 on the bottle. When the bottle 50 is tipped up for drinking, the water in the body 56 of the bottle flows through the bottom wall 16, through the media 26, out from the lid 18 and through the bottle valve 58 into the user's mouth. The cup 12 extends preferably about 1–3 inches down into the bottle, that is, far enough to provide enough interior space 28 for the desired media 26 volume, while not so far as to prevent the flow of water into the cup bottom wall 16 when the bottle is tilted upwards and the bottle is only partly full.

The cartridge 10 is specially designed to cooperate with the bottle neck 52 and cap 55 to allow a water-tight seal between bottle neck 52, cartridge 10, and cap 55 without requiring modification of the bottle 50 or cap 55. Several features particularly contribute the seal: the angle of the inner surface 34 of the upending wall 22, the thinness of the upending wall 22 at the connection between wall 22 and flange 24, the expandability of the upper wall 22, and the flexibility of the typical cap knife 62. First, the inner surface 34 of the upending wall 22 is formed at an angle of 10°–20° (preferably about 15°) from vertical, or, in other words, about 15° from parallel to the longitudinal centerline of the bottle mouth 70 and neck. Secondly, the upending wall preferably transitions from a thickness of about 0.062 inches to a thickness of preferably less than about 0.03 inches (preferably about 0.022 inches) in the region of the inner surface 34, so that only a thin wall rests between the cap knife 62 and the bottle neck. Thirdly, the upper portion 20 of the cup 12 is made of an expandable material such as high density polyethylene (HDPE) plastic, which allows the upending wall 22 to flex outward slightly as the cap 55 is installed. Fourthly, the typical cap knife 62, protruding downward from cap underside, is slightly flexible. Therefore, as the cap's knife 62 comes down and meets the upending wall 22, the knife 62 contacts the slanted inner surface 34 and is deflected slightly inward, by about 1/100 inch, and the upending wall 22 is slightly deflected outward towards the neck 52. Thus, the cap 55 may be screwed down or otherwise lowered almost to the extent that it could be if the cartridge 10 were not in place.

Figures 2, 3, 4:
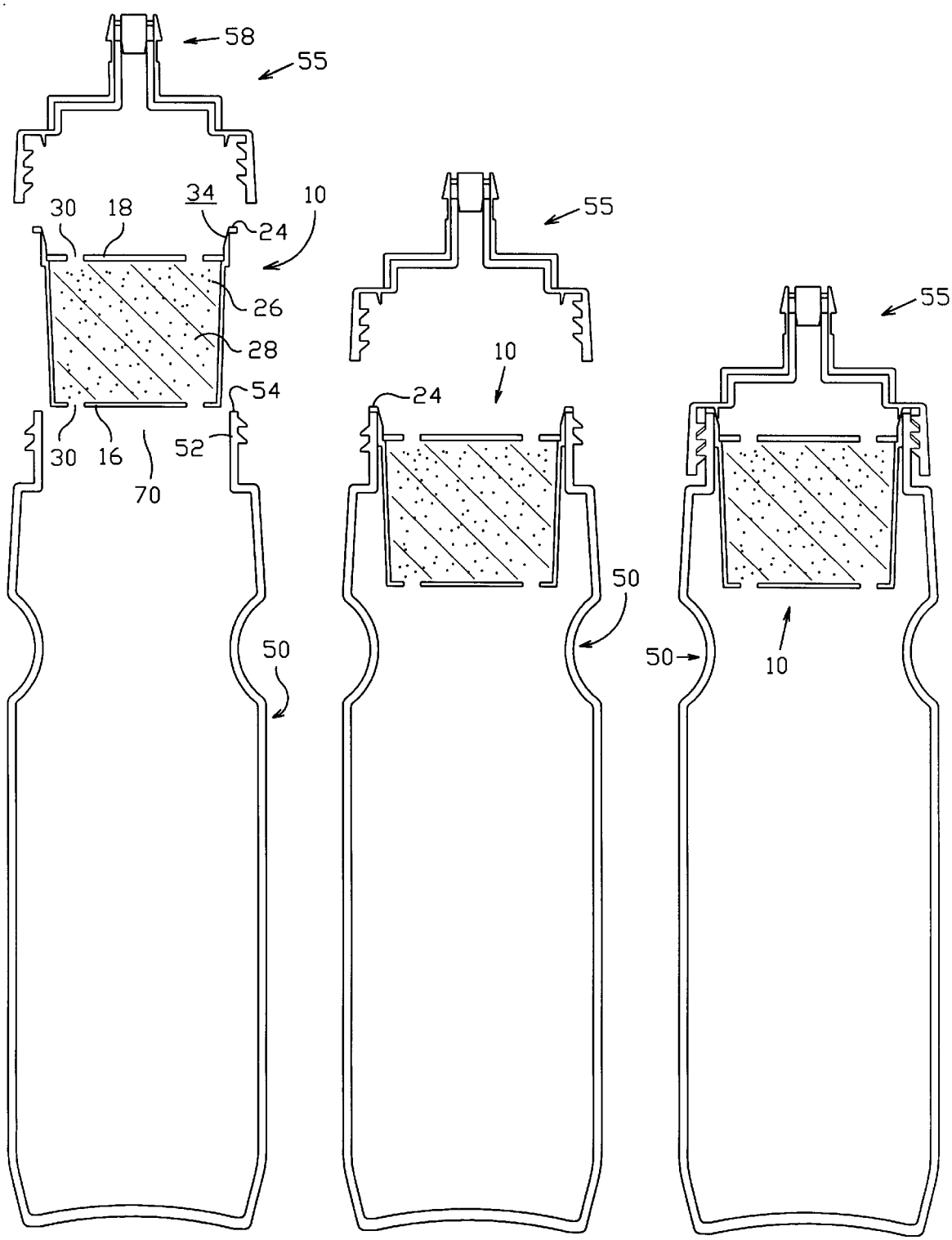
FIG. 2 is a schematic side cross-sectional view of the filter cartridge of FIG. 1, in position for installation between the body and the cap of the sports bottle.
FIG. 3 is a schematic side cross-sectional view of the filter cartridge of FIG. 1, installed in the sports bottle neck.
FIG. 4 is a schematic side cross-sectional view of the filter cartridge of FIG. 1, in the neck of the sports bottle with the bottle cap installed.
Figure 5:
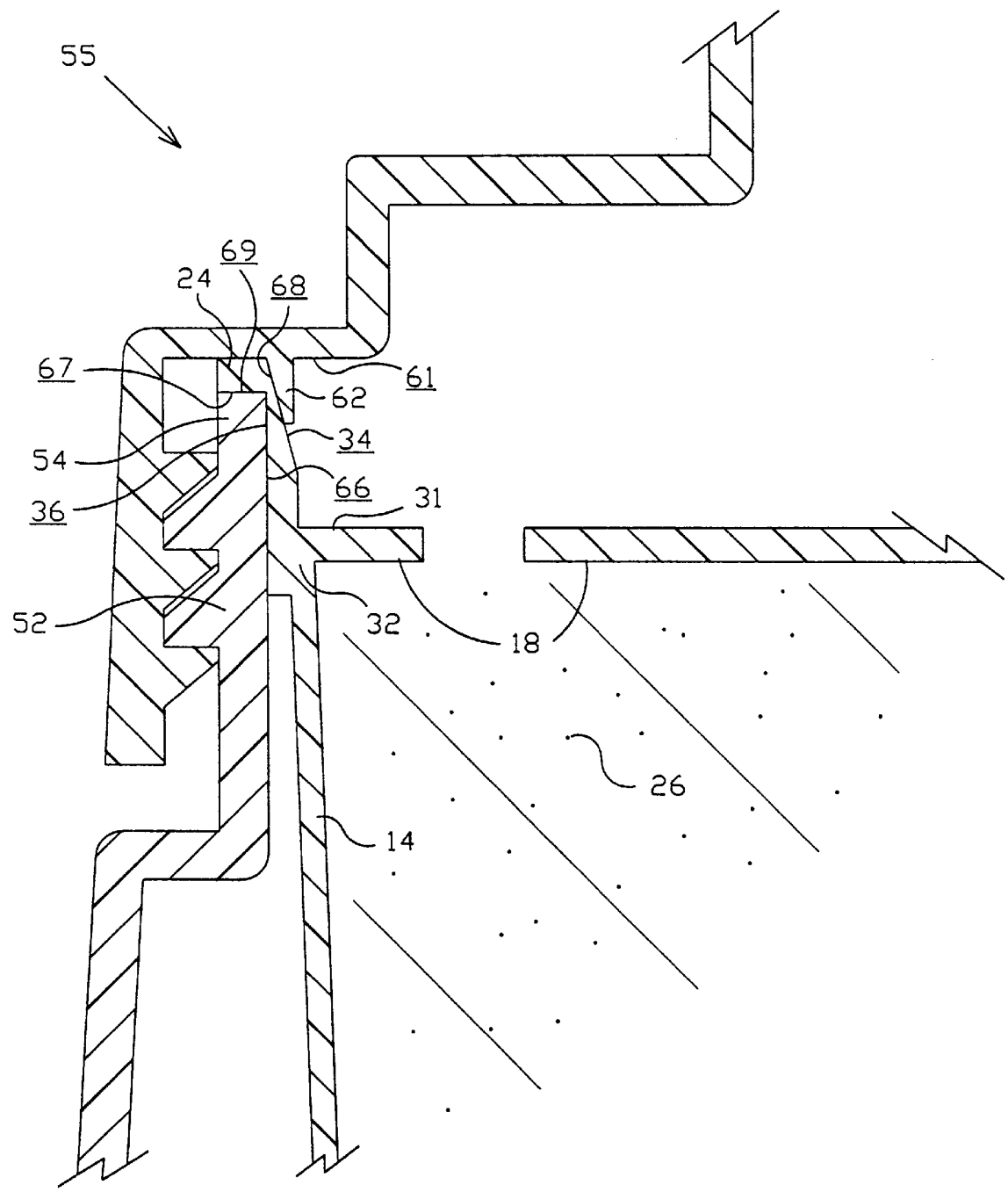
FIG. 5 is a cross-sectional detail of the cooperation between the upper portion of the filter cartridge of FIG. 1, the neck of the sports bottle, and the bottle cap.

When the cap is installed, as shown in FIGS. 4 and 5, the flange 24 lies in between the cap and the lip 54 of the neck 52, and the upending wall 22 is positioned in between the side of the lip 54 and the knife 62. Thus, a tight seal is created by contact of the lip side surface 66 with the upending wall outer surface 36, and contact of the upending wall inner surface 34 with the outer surface 68 of the knife 62. Alternatively, the bottom surface of the flange 67 may seal against the lip top surface 69 to create or contribute to the neck-cartridge seal. The flexibility of the upper portion 20 allows the position of the upending wall sealing surfaces 34, 36 to adjust to create the tight seal. In effect, the cartridge sealing surfaces (34, 36) cooperate with the neck 52 and cap 55 to replace the seal that is normally created by the contact of the bottle neck with the cap knife 62.

The cartridge lid 18 is positioned approximately 0.3–1.0 inches (preferably 0.375 inches) below the flange 24, to allow the upper portion 20 to flex without breaking away from the lid 18. If the lid 18 were located up close to the flange 24, flexing of upper portion 20 would tend to break the lid's connection to the cartridge and cause leaking of media or channeling of water through the media.

The flange 24 outer circumference is preferably slightly larger than the outer circumference of the lip 54. This creates a slightly-overhanging edge to grasp with one's fingernails for removing the filter cartridge 10 from the bottle.

A slight draft in the manufacture of the cup side wall 14 is preferable for making the side wall 14 taper to a slightly smaller diameter at the wall bottom than the wall top. Especially in long-neck or narrow-neck bottle designs, this draft, preferably about 2–3 degrees, permits air to reach into the space between the cup side wall and the bottle inner wall, thus, making easier the insertion and removal of the filter cartridge.

Alternatively, other media containment means may be used besides the cup 12, for example, containment means that do not completely surround the media, but rather encircle or attach to media. For example, in the case of solid block of media, the containment means could be an open-ended cylinder or ring around the circumference of a cylindrical carbon block. A securing means such as the upper portion 20 of the preferred embodiment may be attached to, or extend integrally up from, the cylinder or ring to secure the carbon block and cylinder or ring in the bottle.

Alternatively, other securing means may be used besides the generally cylindrical, flanged upper portion 20. For example, tabs, hooks, or other extensions from the containment means may be used for holding the cartridge in place and forming a seal with the bottle neck and the cap. The various extensions preferably should have the effective slanted inner sealing surface, an outer sealing surface, thin wall, and flange or other extension for resting on the bottle neck. The outer sealing surface may include a surfaces that seal against the neck inner wall and/or against the top surface of the neck lip.

The invented filter cartridge has many advantages, including simplicity and economy. With a change in diameter, the cartridge can be adapted to fit into a wide variety of sports bottles. The simple, yet effective design of the upper portion 20 or other extension member as securing and sealing means, allows the cartridge 10 to be especially effective and well-sealing with caps having a variety of knifes or other sealing protrusions.

Although this invention has been described above with reference to particular means, materials and embodiments, it is to be understood that the invention is not limited to these disclosed particulars, but extends instead to all equivalents within the scope of the following claims.

We claim:

1. A filter cartridge for a sports bottle having a mouth with a longitudinal centerline, a neck defining the mouth, a neck lip and a cap having a downwardly-protruding sealing ring, the cartridge comprising:
   a media container with an axial centerline for placement generally coaxially within a sports bottle neck; and
   an entension connected to said media container for extending between a sports bottle neck and cap for securing the cartridge into the sports bottle, the extension having a generally-axial upending wall with a top end and a generally radial member extending outward from the top end of the upending wall for resting on the neck lip, and the upending wall having a slanted inner sealing surface generally facing the axial centerline and slanting from bottom to top away from said axial centerline, said slanted inner sealing surface being for sealing with the downwardly-protruding sealing ring of the cap.

2. A filter cartridge as set forth in claim 1, wherein said extension is flexible outward from the axial centerline of the media container.

3. A filter cartridge as set forth in claim 1, wherein said extension has a region with a thickness of less than 0.03 inches for fitting between the neck and the cap sealing ring.

4. A filter cartridge as set forth in claim 1, wherein said extension is made of high density polyethylene.

5. A filter cartridge for a sports bottle having a mouth with a longitudinal centerline, a neck defining the mouth, a neck lip and a cap having a downwardly-protruding sealing means, the cartridge comprising:
   a media containment means; and
   a securing means connected to said media containment means for extending between a sports bottle neck and cap for securing the cartridge into the sports bottle, wherein the securing means comprises an extension from the containment means having a generally radial member for resting on the neck lip, wherein said extension comprises a slanted inner sealing surface generally facing a longitudinal centerline of the bottle mouth and slanted 10°–20° from the said longitudinal centerline, said slanted inner sealing surface for sealing with the downwardly-protruding sealing means of the cap.

6. A filter cartridge as set forth in claim 5, wherein said extension is flexible outward from the longitudinal centerline of the bottle mouth.

7. A filter cartridge as set forth in claim 5, wherein said extension has a region with a thickness of less than 0.03 inches for fitting between the neck and the cap.

8. A filter cartridge as set forth in claim 5, wherein said extension is made of high density polyethylene.

9. A filter system comprising:
   a sports bottle having a mouth with a longitudinal centerline, a neck defining the mouth, a neck lip and a cap having an underside and a sealing ring protruding downwardly from the underside, the sealing ring having an outer surface; and
   a filter cartridge comprising:
      a generally cylindrical media containment means having an axial centerline and received generally coaxially within the sports bottle neck; and
      a generally cylindrical extension connected to and generally coaxial with said cylindrical media containment means, the extension having a generally-axial upending wall with a top end and the extension having a radial member extending outward from the top end of the upending wall and extending between the sports bottle neck lip and cap for securing the cartridge into the sports bottle, the upending wall having a slanted inner sealing surface generally facing the axial centerline of the media containment means and slanting away from said axial centerline, said slanted inner sealing surface contacting and sealing with the outer surface of said sealing ring of the cap.

10. A filter cartridge as set forth in claim 9, wherein said extension is flexible outward from the axial centerline of the media containment means.

11. A filter cartridge as set forth in claim 9, wherein said extension has a region with a thickness of less than 0.03 inches for fitting between the neck and the sealing ring.

12. A filter cartridge as set forth in claim 9, wherein said extension is made of high density polyethylene.

13. A filter cartridge for a sports bottle having a mouth with a longitudinal centerline, a neck defining the mouth, a neck lip and a cap, the cartridge comprising:
   a generally cylindrical media containment means; and
   a generally cylindrical extension connected to and generally coaxial with said cylindrical media containment means, the extension having a radial member for extending between a sports bottle neck lip and cap for securing the cartridge into the sports bottle, wherein the cylindrical extension has an inner surface and an outer surface, and wherein the inner surface is slanted at 10°–20° from parallel to the mouth centerline.

14. A filter cartridge as set forth in claim 13, wherein the cylindrical extension is expandable for being forced outward from the mouth centerline towards the bottle neck for sealing with the bottle neck.

15. A filter cartridge as set forth in claim 13, wherein the cylindrical extension has a region with a thickness of less than 0.03 inches for fitting between the neck and the cap.

16. A filter cartridge as set forth in claim 13, wherein the generally cylindrical containment means comprises a cup having a side wall, bottom wall, and lid.

17. A filter cartridge as set forth in claim 13, wherein the generally cylindrical containment means comprises a ring for encircling a solid media.

18. A filter cartridge as set forth in claim 13, wherein the cylindrical extension is made of high density polyethylene.

19. A filter cartridge for a sports bottle having a mouth with a longitudinal centerline, a neck defining the mouth, a neck lip and a cap with a downwardly-protruding sealing means, the cartridge comprising:

a cup for containing media and placement into a sports bottle generally coaxially with the bottle neck, the cup having a generally cylindrical upper portion for securing the cartridge into the sports bottle, the upper portion having an upending wall with a top end and a flange extending radially outward from the top end of the upending wall, the flange for resting on the neck lip; and wherein the upper portion has an inner sealing surface slanted outward from bottom to top at 10°–20° from parallel to the mouth longitudinal centerline for contacting, diverting inwards, and sealing with a cap sealing means;

wherein the upper portion is less than 0.03 inches in thickness near the inner sealing surface for fitting between the bottle neck and the cap sealing means; and wherein the upper portion is expandable outward for being forced toward the bottle neck by the cap sealing means.

20. A filter cartridge as set forth in claim 19, wherein the inner sealing surface is slanted outward at about 15° from parallel to the mouth longitudinal centerline.

* * * * *